No. 886,461. PATENTED MAY 5, 1908.
B. AIKMAN.
VALVE OILING DEVICE.
APPLICATION FILED OCT. 15, 1906.
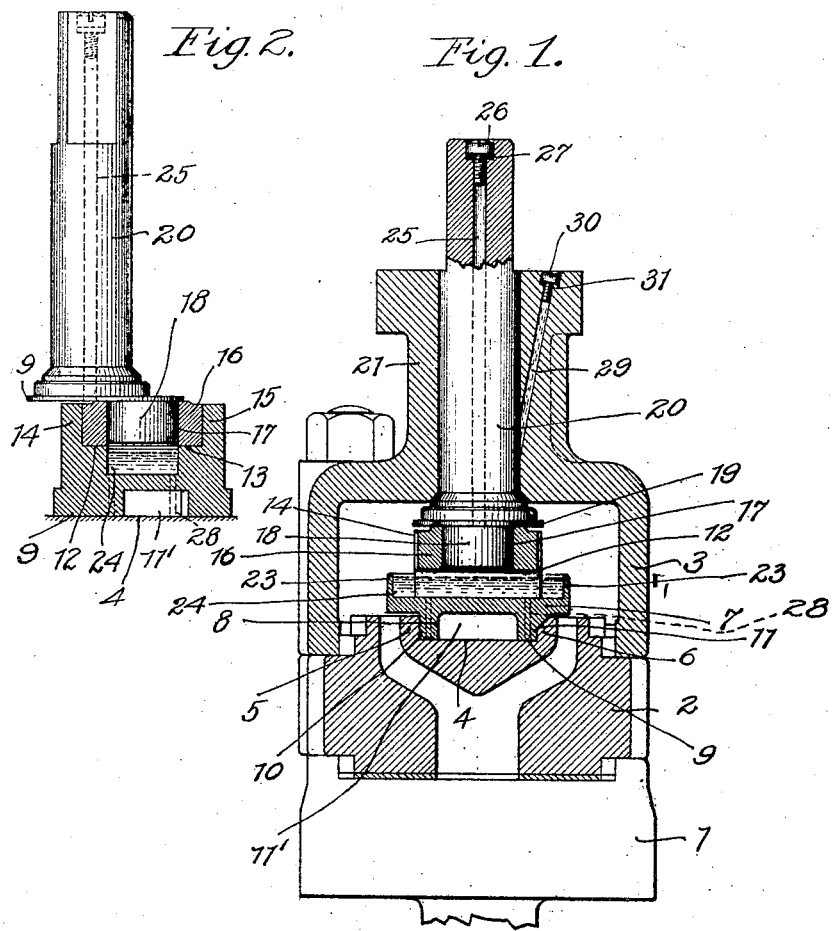
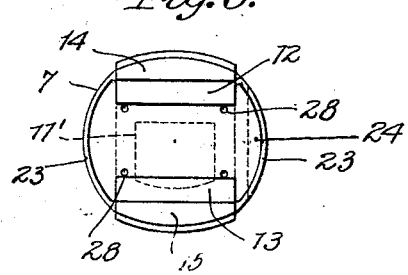
Witnesses:
Leonard W. Novander.
Charles J. Schmidt.
Inventor
Bert Aikman
By Charles A. Brown
Attorney

UNITED STATES PATENT OFFICE.

BERT AIKMAN, OF CHICAGO, ILLINOIS, ASSIGNOR TO NATIONAL BRAKE AND ELECTRIC COMPANY, OF MILWAUKEE, WISCONSIN, A CORPORATION OF WISCONSIN.

VALVE-OILING DEVICE

No. 886,461.   Specification of Letters Patent.   Patented May 5, 1908.

Application filed October 15, 1906. Serial No. 338,931.

*To all whom it may concern:*

Be it known that I, BERT AIKMAN, a citizen of the United States, residing at Chicago, in the county of Cook and State of Illinois, have invented a certain new and useful Improvement in Valve-Oiling Devices, of which the following is a full, clear, concise, and exact description, reference being had to the accompanying drawings, forming a part of this specification.

My invention relates to valve mechanism, and its object is to provide improved oiling means for valves, particularly, engineers' valves or the like.

In engineers' valves there is usually employed a slide valve reciprocating over a valve seat in one direction and a slide block and other members connecting the valve with a valve stem to cause reciprocation of the valve upon rotation of the valve stem. In these devices the friction between the slide valve and seat is considerable, as the valve is subjected to compressed air in the valve chamber, and various means for lubricating the valve parts to prevent wear resulting from such friction have been proposed but have not been successful for the reason that in all of these devices the oil is drawn and blown away from the engaging surfaces by the compressed air leaving the valve chamber.

Although my invention can be applied to valves of different construction, it was designed to be used principally in conjunction with the engineer's valve shown and described in the joint co-pending application of Ohlsen upon engineers' valves for air brake systems, executed April 9, 1907 and filed April 11, 1907, and I shall describe my invention in connection with such valve in the accompanying drawings.

Figure 1 is a sectional view of a valve showing the various valve operative parts and my improved oiling device; Fig. 2 is an isolated view of the valve parts and valve stem taken from the left of Fig. 1, and Fig. 3 is a top view of the slide valve.

In this engineer's valve, the frame comprises the base 1, seat 2 and the bonnet 3 suitably secured together in any manner. Extending from the valve seat at the sides of the slide surface 4 are the parallel guide walls 5 and 6 whose upper inner edges may be either straight or beveled. The slide valve 7 has the rectangular projection 8 whose base 9 engages the slide surface 4 and whose sides 10 and 11 engage the guide walls 5 and 6 respectively. In this extension is formed the valve pocket 11' for controlling the connection of valve ports with each other and with the valve chamber within the bonnet 3 in any well known manner.

Extending upwardly from the slide valve are the parallel seat projections 12 and 13 and extending from these seat projections are the parallel guide walls 14 and 15 respectively, the seat and guide walls being at right angles to the guide walls 5 and 6 on the valve seat.

Seated on the seat walls 12 and 13 and between the guide walls 14 and 15 is a slide block 16 having an opening 17 in which engages the crank pin 18 at the end of the crank arm or plate 19 whose other end is attached to the valve stem 20 extending upwardly through the neck 21 of the bonnet and terminating in the polygonal end adapted for engagement with a handle whereby the stem may be turned. Owing to the eccentric position of the pin 18 with respect to the stem 20 the turning of the stem causes reciprocation of the block 16 across the valve on the seat-projections 12 and 13 such movement also causes a reciprocation of the valve across the valve seat.

For the application of my oiling device, the construction of the valve is slightly modified. Walls 23 connect together the ends of the seat extensions 12 and 13, thereby forming a well 24 on top of the valve which may be filled with oil in any manner, preferably through a drilled hole or passageway 25 through the valve stem whose outlet may be hermetically sealed by the screw 26 and gasket 27. To lead the oil from the well to the bearing surfaces, small openings or passageways 28 are drilled through the valve at the sides of the valve pocket, as best shown in Fig. 3, and thus, as the valve reciprocates, the oil will be spread between the surfaces 4 and the lower surface of the valve, capillary attraction causing the oil to also spread over the sides 10 and 11 and the guide walls 5 and 6. The oil will also creep from the well along the side projections 12 and 13 and between the valve block and the surrounding walls, oil also reaching the bearing surfaces between the crank pin and block. The oil being confined in this horizontal well on top of the valve cannot be blown or carried away by the compressed air, and thus constant lubrication is obtained The pressure of the air in the valve chamber rather facilitates the distribution of the oil, as the pressure of the air upon the oil surface will tend to force the oil through the distributing openings 28 and between the bearing surfaces. The valve stem can be readily oiled from a well or oil passageway 29 drilled through the neck of the valve bonnet, its inlet being also hermetically sealed by a screw 30 and gasket 31.

I thus provide an oiling device for valves of this kind which insures sufficient lubrication at all times, the compressed air, as before stated, serving to assist in lubrication rather than destroy it as in other devices.

What I claim as new and desire to secure by Letters Patent is:—

1. In an oiling device to be associated with an engineer's valve, the combination with a valve seat, a valve adapted to slide thereon, said valve having upwardly extending walls forming a pocket for receiving oil, there being ports leading from said pocket to the engaging surfaces of the valve and valve seat to introduce oil between said surfaces, there being an opening leading vertically through the stem of the valve and adapted to introduce oil into the pocket.

2. In an engineer's valve, the combination with a slide valve adapted to reciprocate over a valve seat within a valve chamber, a slide block adapted to reciprocate on said valve, an oil well carried by said valve, there being passageways for distributing oil from said well to the various bearing surfaces.

In witness whereof, I hereunto subscribe my name this 9th day of October A. D., 1906.

BERT AIKMAN.

Witnesses:
CHARLES J. SCHMIDT,
ARTHUR H. BOETTCHER.